May 23, 1961 R. E. WIRTH 2,985,203
EDGE PATCHING APPARATUS
Filed Oct. 21, 1957 6 Sheets-Sheet 1

INVENTOR
Raymond E. Wirth
BY Robert M. Dunning
ATTORNEY

INVENTOR
Raymond E. Wirth
BY Robert M. Dunning
ATTORNEY

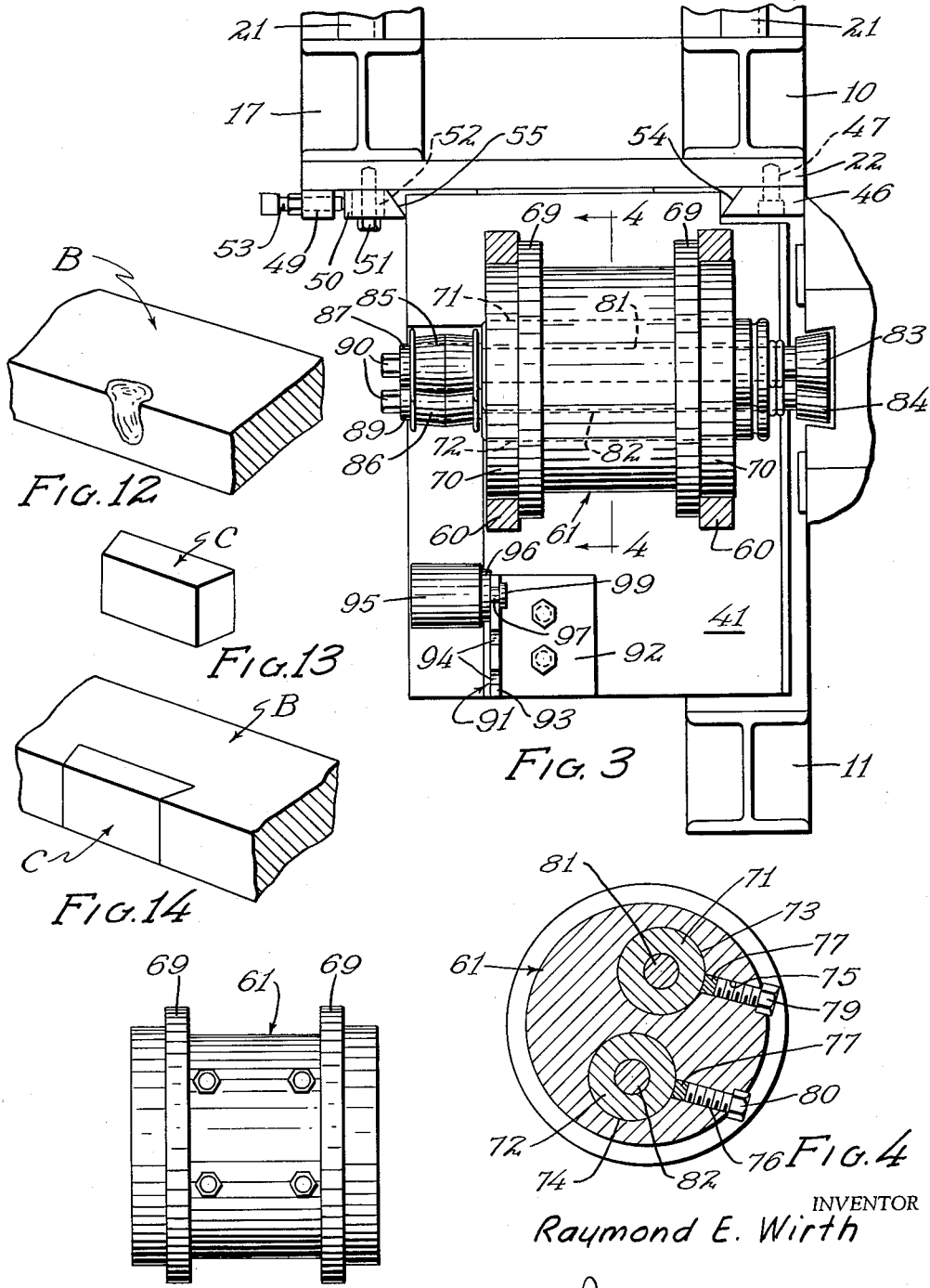

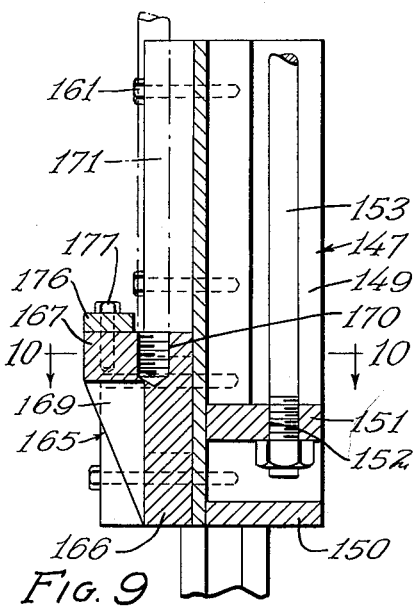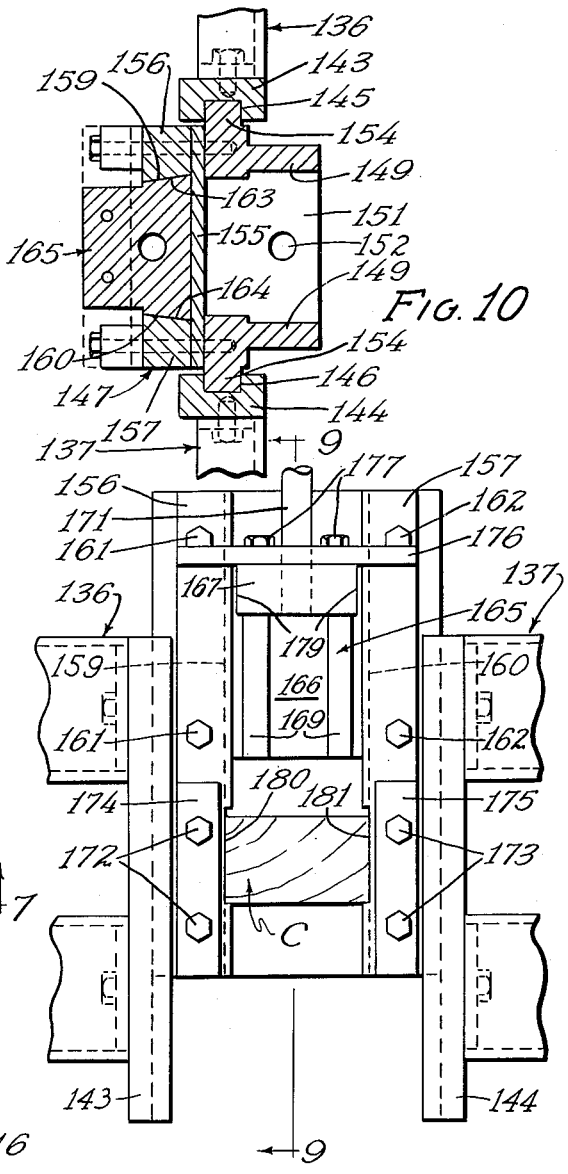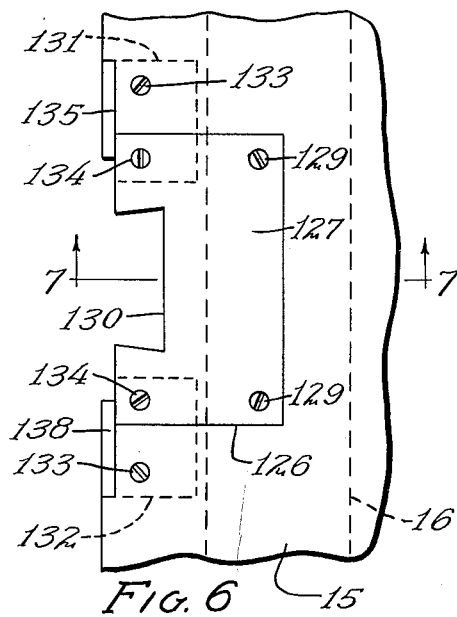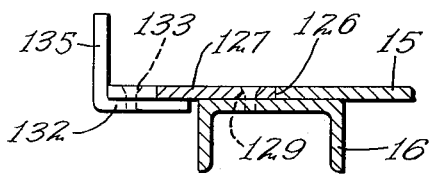

May 23, 1961 R. E. WIRTH 2,985,203
EDGE PATCHING APPARATUS
Filed Oct. 21, 1957 6 Sheets-Sheet 6

INVENTOR
Raymond E. Wirth
BY Robert M. Dunning
ATTORNEY

United States Patent Office 2,985,203
Patented May 23, 1961

2,985,203

EDGE PATCHING APPARATUS

Raymond E. Wirth, St. Paul, Minn., assignor, by mesne assignments, to Weyerhaeuser Company, Tacoma, Wash., a corporation of Washington Filed Oct. 21, 1957, Ser. No. 691,258

16 Claims. (Cl. 144—2)

This invention relates to an improvement in edge patching apparatus and deals particularly with a machine useful for forming a wedge shaped notch in the edge of a board, thus cutting out a defecting or weakened part of the board and inserting in this notch a similarly shaped patch to produce a firm and solid board.

It is an object of the present invention to provide an edge patching machine which includes a board support such as a board receiving table provided with indexing shoulders for properly locating the edge of the board to be patched with respect to the table. Clamping means are provided which clamp the board against the indexing shoulders and for clamping the board against the table or other support. Cutter means are provided which are movably supported on one side of the table or support and which are capable of moving across the plane of the support and board supported thereby. These cutters, when moved through the board form a wedge shaped notch in the edge of the board, cutting away a defective or weakened area in the edge of the board such as a knot in the board or the area surrounding a knot which has been separated from the board during the cutting or handling thereof. At the completion of the cutting operation, a patch is inserted in the notch which frictionally engages in place.

A feature of the present invention resides in the provision of a machine of the character described which functions automatically throughout the major portion of its cycle. After the board has been properly positioned upon the table, a control is actuated which carries the apparatus through a series of steps. Upon actuation of the control, the clamp is operated which acts to clamp the board against the indexing shoulders. Shortly after the board has been clamped in this direction, a second clamp is actuated which urges the board against the table. When the board has been properly clamped, means is set into motion for reciprocating the cutting blades through the board, the cutters being carried through the board first in one direction and then in the reverse direction until the cutters reach their normal retracted position. If desired, the operating ram for urging the patch into place may also be automatically operated. However, there is some advantage in momentarily stopping the cycle at this point if desired. As a result, additional switch means are provided which may be actuated simultaneously with the starting of the cycle if desired or which may be later actuated if a temporary stop in the cycle is desired for forcing the wedge into place, and then returning the wedge ram and the board clamps to starting position.

A feature of the present invention resides in the provision of a clamp which straddles the portion of the board to be cut so that the force holding the board against its support is closely adjacent to the portion of the board being cut. To accomplish this result, the clamp is recessed or grooved in a manner to permit the cutters to move between the sides of the clamp during their reciprocation.

A further feature of the present invention resides in the provision of a clamp which serves the double purpose of clamping the board firmly against the support and also forming a guide for the ram which inserts the patch in place. The clamp includes a wedge receiving pocket capable of supporting a wedge directly above the notch cut in the board. As the wedge ram is operated, it forces the wedge toward the board while being guided by portions of the ram until the wedge is firmly driven in place. Sufficient force is exerted so that the patch will remain frictionally engaged in the notch thus eliminating the need for adhesive.

A further feature of the present invention resides in the provision of a cutter unit which may be arranged to cut notches of various widths while retaining the same taper. The cutting unit includes a pair of rotatable cutters which are mounted in a suitable support, which support is rotatably adjustable about an axis parallel to the axis of rotation of the cutter shaft and located centrally therebetween. If these cutters were adjusted into position so that one shaft was directly above the other, the width of notch formed would be equal to the diameter of the cutters. Upon rotation of the support upon its center of rotation, the axis of one shaft moves to one side of a vertical plane through the axis of the support and the other cutter moves a corresponding distance to the other side of this plane. Thus, by rotating the support about its axis, the width of the notch being formed may be regulated. This arrangement also provides for variations in the diameter of the cutters due to wear or resharpening of the cutter heads.

These and other objects and novel features of the present invention will be more clearly and fully set forth in the following specification and claims.

In the drawings forming a part of the specification:

Figure 3 is a sectional view on a horizontal plane through the cutting head, the view showing both cutter supports whereas only one support would normally be visible in this section, the position of the section being indicated by the line 3—3 of Figure 1.

Figure 4 is a cross sectional view through the cutter support, the position of the section being indicated by the line 4—4 of Figure 3.

Figure 5 is an elevation view of the rotatable cutter support removed from the remainder of the apparatus.

Figure 6 is a plan view of a detail portion of the table showing the portion thereof through which the cutter heads reciprocate.

Figure 7 is a sectional view through a portion of the table, the position of the section being indicated by the line 7—7 of Figure 6.

Figure 8 is a front elevational view showing the vertical board clamp and the patch ram.

Figure 9 is a sectional view through the structure shown in Figure 8, the position of the section being indicated by the line 9—9 of Figure 8, Figure 9 showing the wedge ram in lowered position.

Figure 10 is a sectional view through the clamp and ram, the position of the section being indicated by the line 10—10 of Figure 9.

Figure 12 is a perspective view of a portion of the board to be patched.

Figure 13 is a perspective view of the patch to be used in the board shown in Figure 12.

Figure 14 is a perspective view of the section of board after the patching operation.

Figure 1:
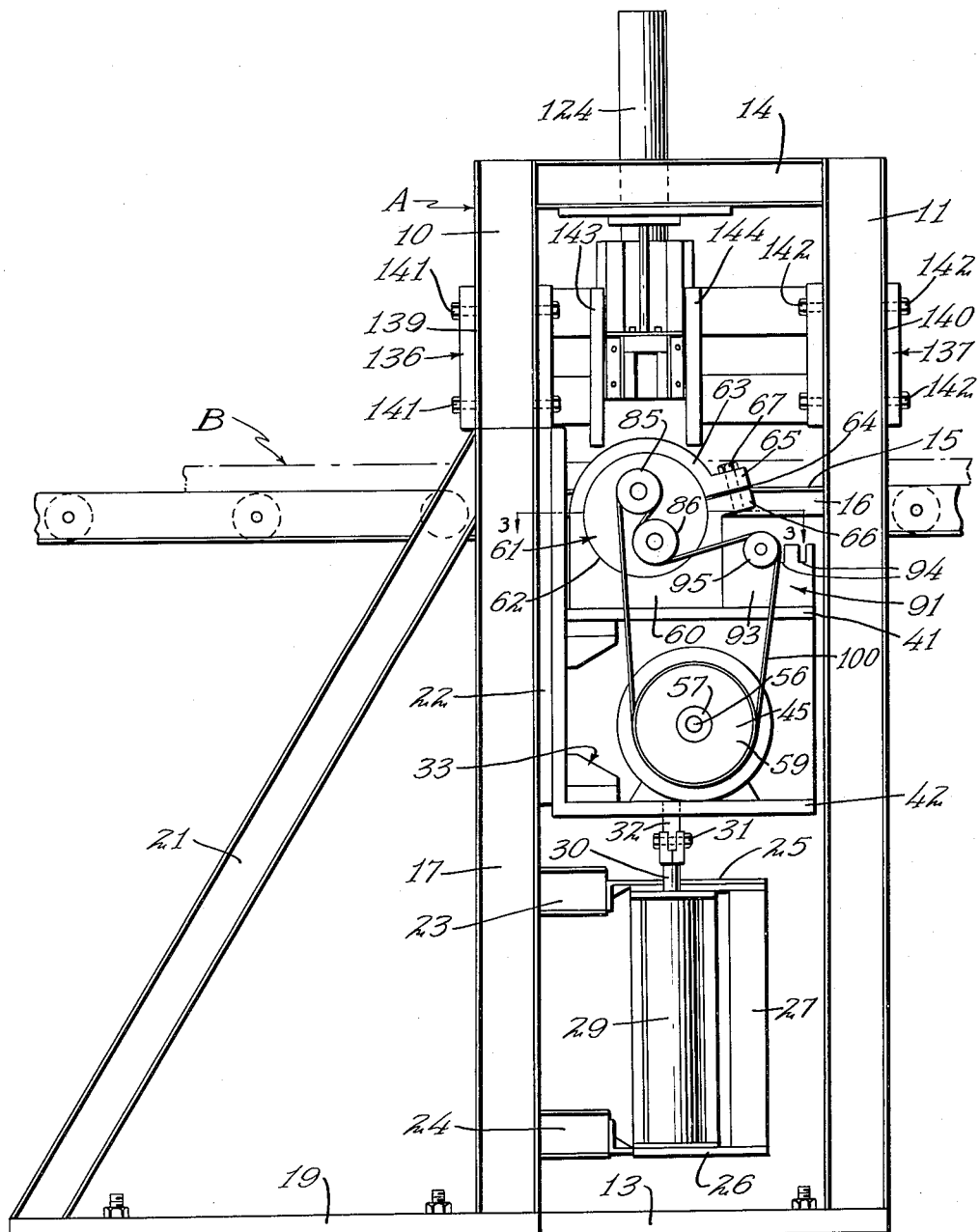
Figure 1 is a front elevational view of the edge patching apparatus, showing the general arrangement of parts therein.
Figure 2:
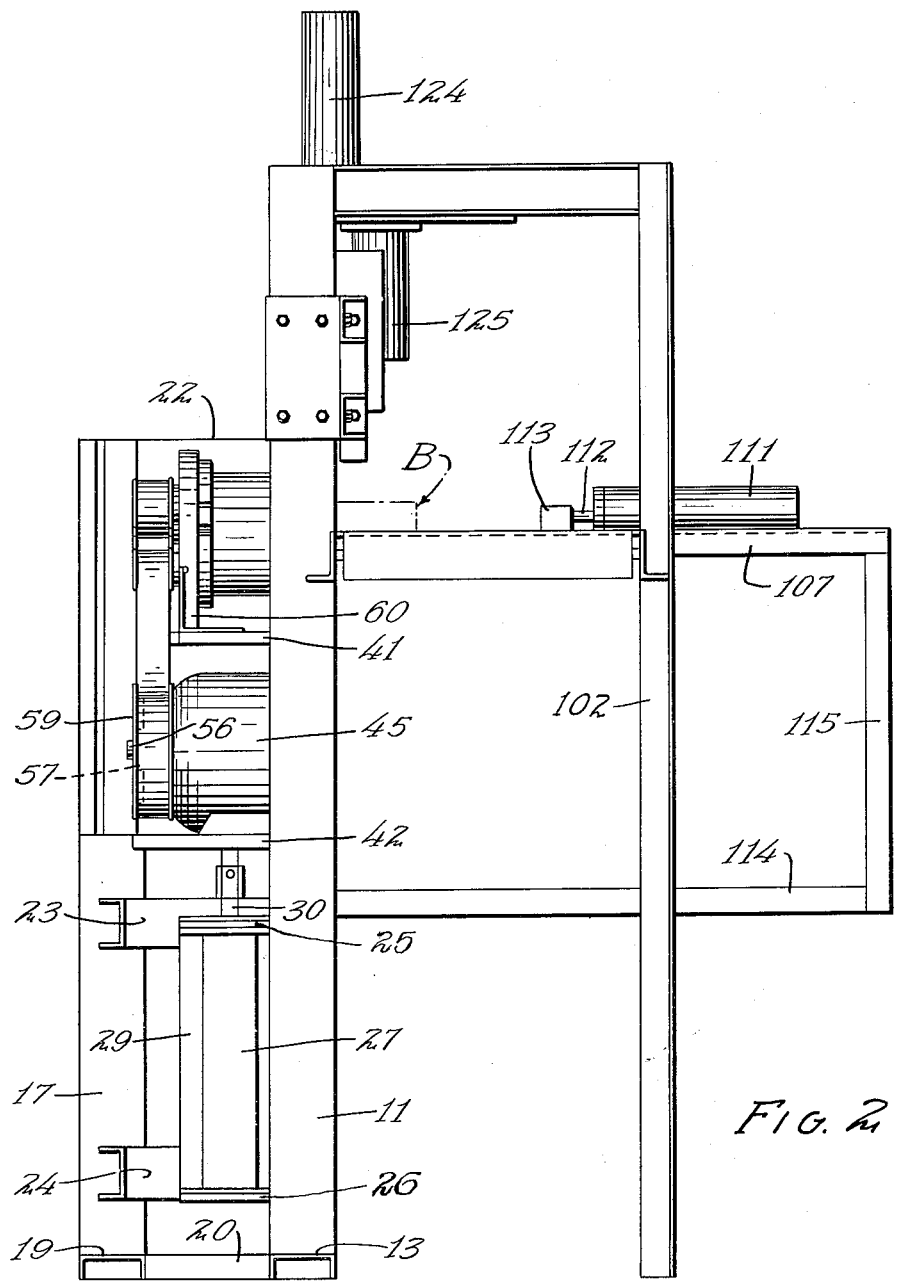
Figure 2 is a side elevational view of the apapratus illustrated in Figure 1.

The edge patching machine is indicated in general by the letter A and includes a supporting frame best illustrated in Figures 1 and 2 of the drawings. The front side of the frame includes a pair of parallel vertically arranged I beams 10 and 11 which are mounted to extend upwardly from an elongated inverted channel 13. The upper ends of the beams 10 and 11 are connected by a transverse connecting member 14 and the beams are farther secured in parallel relation by a table 15 and its supporting angles 16.

An upright frame member or I beam 17 is mounted on an inverted channel 19 extending parallel to the channel 13 and spaced forwardly therefrom. The beam 17 is mounted forwardly of the beam 10 and the two upright frame members are connected by spaced channels such as 20. Upwardly inclined I beam braces such as 21 connect the ends of the base members 13 and 19 with their corresponding uprights 10 and 17 respectively.

A mounting panel 22 connects the upper end of the upright 17 to the upright 10, this panel 22 serving, as will be later described, as a support for the cutter mechanism. A pair of generally U-shaped brackets 23 and 24 project from the uprights 17 and 10 to act as supports for extension brackets 25 and 26 which are held in spaced relation by a vertical spacing member 27. The extension brackets 25 and 26 act as a support for a fluid actuated cylinder 29 containing a piston (not illustrated) provided with a piston rod 30 projecting from the upper end thereof. The upper end of the piston rod 30 is hingedly connected at 31 to a projection 32 mounted at the lower end of a cutter carriage illustrated in general by the numeral 33. The cutter carriage is vertically slidably supported upon the mounting panel 22 as will be described more in detail.

Figure 15:
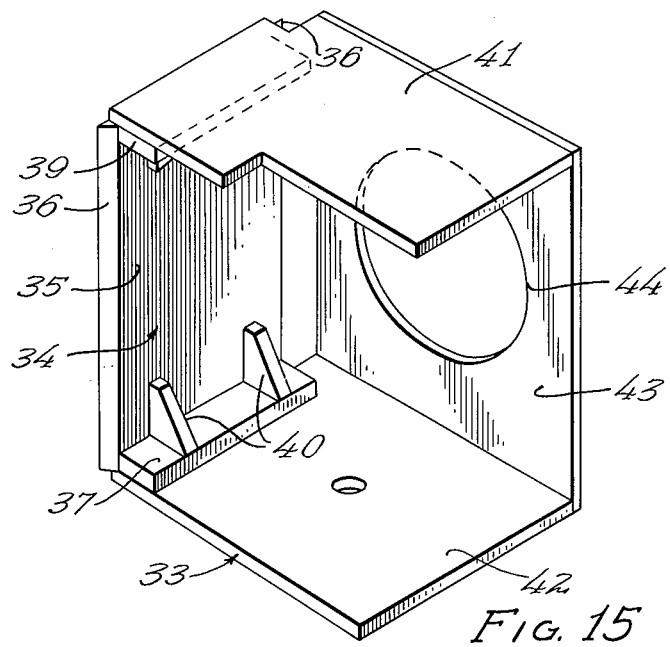
Figure 15 is a perspective view of the cutter table assembly.

The cutter supporting table 33 is constructed as best illustrated in Figure 15 of the drawings. This table includes a slide 34 formed of cast iron or suitable material and including a vertical panel 35 having oppositely sloping sides 36 and provided with an integral bottom flange 37 and a parallel top flange 39. Gussets such as 40 reinforce this slide member. A top plate 41 extends laterally from the top flange 39 and is of generally rectangular shape. A bottom panel 42 extends laterally from the bottom flange 37 and is anchored suitably thereto. A connecting panel 43 joins the superimposed rear edges of the panels 41 and 42 to provide a reinforcing connection for the same. The panel 43 is provided with a circular opening 44 extending therethrough to accommodate the end of the cutter motor 45. As is indicated in Figures 1 and 2 of the drawings, the cutter motor 45 is mounted upon the bottom panel 42 with its axis of rotation extending normal to the rear panel 43.

As is best indicated in Figure 3 of the drawings, a slide guide 46 is mounted vertically along the rear edge of the mounting panel 22 by bolts 47 or other suitable means. A strip 49 extends vertically along the forward edge of this same mounting plate 22 in parallel relation to the slide guide 46. A second slide guide 50 is adjustably mounted by bolts 51 or other suitable means to extend vertically on the mounting plate 22 rearwardly of the strip 49. The bolts 51 extend through slots 52 in the slide guide 50 to permit forward and rearward adjustment of the slide guide 50. Clamping bolts 53 extend rearwardly through the strip 49 and bear against the slide guide 50 to hold the guide in an adjusted relation.

The slide guides 46 and 50 have inclined opposed vertical edges 54 and 55 respectively to engage the correspondingly inclined edges 36 of the vertical plate 35 of the casting 34. Thus, the inclined edges of the slide guides form ways for slidably supporting the carriage 33 for movement vertically of the mounting plate 22.

As is indicated in Figure 2 of the drawings, the cutter operating motor 45 is mounted upon the panel or platform 42 and includes a motor shaft 56 which supports the hub 57 of a belt pulley 59. A pair of spaced lined brackets 60 are mounted upon the upper shelf or platform 41 to support a generally cylindrical cutter spindle housing 61. The brackets 60 are provided with aligned circular apertures 62 therein to accommodate the ends of the cutter spindle housing 61. The upper ends of the brackets 60 form arcuate bands 63 which are split as indicated at 64. Ears 65 and 66 are provided on the bracket 60 which project radially on opposite sides of the split 64. Clamping bolts 67 extend through the ears 65 and 66 to provide a means of clamping the bands 63 about the spindle housing 61 and to hold this spindle housing in an adjusted position.

As is indicated in Figures 3, 4 and 5 of the drawings, the spindle housing is provided with spaced peripheral flanges 69 near its opposite ends. As indicated in Figure 3, the brackets 60 encircle the cylindrical portions 70 of the cutter spindle housing 61 outwardly of the flanges 69. Thus, it will be seen that the spindle housing 61 may rotate about its axis within the brackets 60 and may be held in an adjusted position by the clamping bolts 67 of the two brackets.

As indicated in Figure 4 of the drawings, spindles 71 and 72 extend through cylindrical bores 73 and 74 respectively which extend through the body of the spindle housing in a direction parallel to the axis of this housing and the axes of the bores 73 and 74 are equally spaced from the axis of the housing 61. Parallel internally threaded apertures 75 and 76 extend through the body of the housing 61 in a radial direction from the bores 73 and 74 respectively. Bearing plugs 77 are provided in the apertures 75 and 76 and are clamped against the surface of the spindles 71 and 72 by set screws 79 and 80. Thus, the spindles 71 and 72 are removably supported in adjusted position in the parallel bores 73 and 74.

The spindles 71 and 72 rotatably support cutter shafts 81 and 82 which are held from axial movement in any suitable way in the spindles and which act to support rotatable cutter heads 83 and 84 respectively. While the detail of these cutter heads is not illustrated, the heads are tapered in form and in outline are frusto-conical so that the notch formed thereby is wider at its inner edge than at the edge of the board being cut.

The cutter shafts 81 and 82 are provided at their forward edges with pulleys 85 and 86 which are rotatable with the shafts and are held in place by any suitable means such as clamping plates 87 and 89 which are held in position by axially extending bolts or by nuts such as 90 on threaded ends of the shafts. The pulleys 85 and 86 are aligned and are also aligned relative to the pulley 59 upon the motor shaft 56.

An angle bracket 91 includes an anchoring flange 92 which overlies the surface of the shelf or panel 41 and a vertical flange 93 having spaced vertical notches 94 in its upper extremity. An idler pulley 95 is rotatively supported upon an axial support 96 including a shank 97 extendable through the bracket flange 93 in any of the notches 94. The shank 97 is provided with an enlarged head 99 which engages rearwardly of the bracket flange 93 so as to hold the pulley 95 with its axis parallel to the axes of rotation of the shafts 81 and 82 and aligned with the pulleys 59, 85 and 86. A belt 100 extends beneath the motor pulley 59, over the idler pulley 95, beneath the lower pulley 86, over the upper pulley 85 and returns to the motor pulley 59. When the spindle housing 61 is adjusted in position, the proper tension may be retained in the belt 100 by adjustment of the position of the idler pulley 95.

Figure 16:
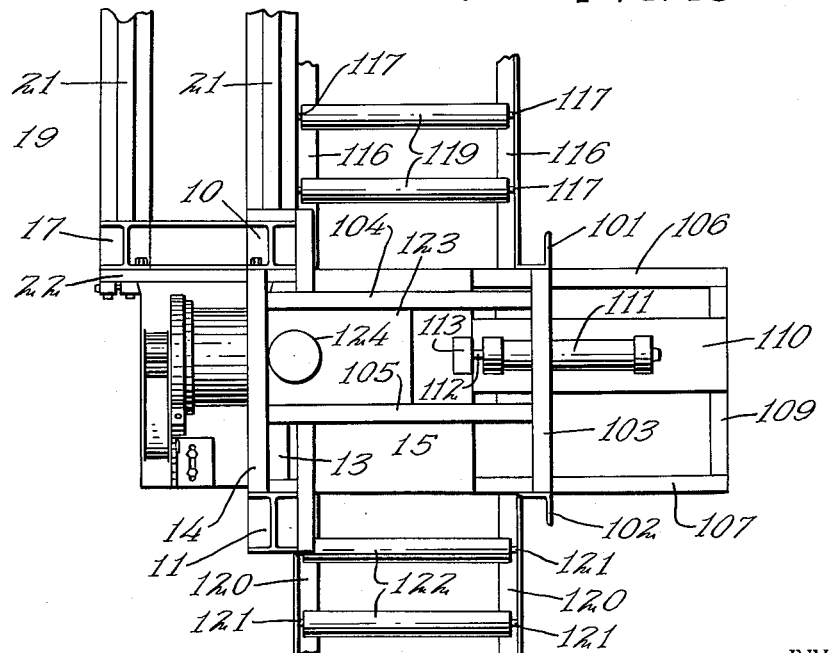
Figure 16 is a top plan view of the apparatus.

With reference again to Figures 2 and 16 of the drawings, it will be noted that the frame of the apparatus also includes a pair of transversely spaced angle iron uprights 101 and 102 which are connected by transverse connecting members such as 103 which extend parallel to the connecting members 14 between the uprights 10 and 11. Right angularly extending channels 104 and 105 connect the top connecting member 14 with the top connecting member 103. A pair of angles 106 and 107 extend rearwardly from the uprights 101 and 102 with their upper surfaces at substantially the level of the work table or support 15. The rear ends of the angles 106 and 107 are connected by a cross brace 109 and a supporting panel 110 extends from the cross brace 109 to the edge of the table 15. A plate or panel 110 is designed to support a fluid cylinder 111 containing a piston (not illustrated) capable of actuating a piston rod 112 connected to a clamping block 113. The clamping block 113 is slidable over the surface of the table 15 against the edge of a board such as B resting upon the surface thereof as will be later described. The frame is further reinforced by transverse frame members 114 connecting the spaced uprights 10, 11 to the uprights 101, 102 and the panel 110 is further reinforced by a vertical brace 115.

A pair of spaced parallel angles 116 extend laterally from the inlet side of the apparatus and these angles support the pivot shafts 117 of rollers 119 which form an incoming conveyor for the boards B and as the upper surfaces of the rollers 119 are at the elevation of the table 15, these rollers also forming horizontal supports for the board during the patching operation. A similar pair of angles 120 extend in spaced relation in a transverse direction from the opposite side of the apparatus frame. These angles 120 form supports for the pivot shafts 121 of rollers 122 which may act to form an outgoing conveyor. The upper surfaces of the rollers 122 are also on the plane of the table 15 so as to act as a board support.

A mounting plate 123 connects the undersurfaces of the parallel top connecting channels 104 and 105 and acts as a support for an upwardly extending fluid cylinder 124 and a downwardly extending fluid cylinder 125. As will be later described in detail, these cylinders are designed to actuate the patch ram and the clamp which holds the board against the table 15.

With reference now to Figures 6 and 7 of the drawings, it will be noted that the forward edge of the table 15 is provided with a generally rectangular notch 126 therein through which the cutter head 83 and 84 may reciprocate during the board cutting operation. This notch 126 is partially filled by an insert 127 which is firmly anchored with its upper surface flush with the surface of the table 15 by means of bolts 129 extending into the table supporting channel 16. The insert 127 includes a trapezoidal notch 130 in its forward surface, the notch being slightly greater than the proportions of the notch to be formed in the board by the cutter heads. The insert 127 may be removed and replaced by a similar insert having a notch 130 of different proportions if the width of the cut is to be changed materially.

Angle members 131 and 132 overlap the juncture between the forward edge of the insert 127 and the table 15 and anchoring screws 133 anchor these angle brackets against the undersurface of the table 15 while similar anchoring bolts or screws 134 connect the horizontal flanges of the angle brackets to the undersurface of the insert 127. The angle brackets 131 and 132 include vertical flanges 135 and 138 which extend upwardly from the surface of the table to form indexing shoulders against which the board may engage on opposite sides of the notch 130.

Brackets 136 and 137 are fabricated from plates and channel members to provide forwardly opening channels 139 and 140 which accommodate portions of the uprights 10 and 11 respectively and the sides of the beam receiving channels are anchored to the beam by bolts such as 141 and 142. The brackets 136 and 137 support spaced vertical guides 143 and 144 which are designed to accommodate the board clamping unit and the patch ram device in a manner which will be more clearly evident from an examination of Figures 8, 9 and 10 of the drawings.

As is evident from Figure 10 of the drawings, the inner opposed surfaces of the vertical slide guides 143 and 144 are grooved as indicated at 145 and 146 to accommodate the vertically movable clamp and guide which is illustrated in general by the numeral 147. The hold-on clamp includes a pair of vertical spaced side members 149 connected at their lower extremity by a pressure or bearing plate 150 (see Figure 9) and also connected by a horizontal partition wall 151. The wall 151 includes a vertical aperture 152 which accommodates a piston rod 153 connected to a suitable piston in the fluid cylinder 125. In lowered position, the bearing plate 150 rests upon the board B to hold it against the table 15.

The side members 149 of the clamping unit 147 include oppositely directed flanges 154 which engage in the slots 145 and 146 of the brackets 136 and 137. The spacing of the side members 149 is reinforced by a bearing plate 155 which forms a vertical partition panel between the front and rear sides of the combined clamp and guide. A pair of transversely spaced vertical slide guides 156 and 157 having inner inclined opposed surfaces 159 and 160 are secured by bolts such as 161 and 162 along opposite side edges of the plate 155. These inclined edges 159 and 160 form a trapezoidal groove for accommodating the similarly inclined side edges 163 and 164 of the patch ram which is indicated in general by the numeral 165.

As may be seen in Figure 9 of the drawings, the patch ram 165 includes a vertical block 166 having a forwardly projecting flange 167 at its upper extremity. Gusset webs 169 reinforce the connection between the block 166 and the flange 167. An internally threaded aperture 170 is provided in the upper surface of the structure to accommodate the piston rod 171 of a piston enclosed within the cylinder 124. Thus, the ram 165 is supported individually of the clamp 147 and is individually reciprocated.

A pair of stop lugs are bolted to the lower ends of the slide guides 156 and 157 by bolts 172 and 173, the stop lugs being identified by the numerals 174 and 175. A stop plate 176 is secured by bolts 177 to the upper surface of the flange 167 to extend beyond the lateral side edges 179 thereof. These laterally projecting ends of the stop plate 176 engage the upper edges of the stop lugs 174 and 175 in lowered position of the patch ram 165 to prevent the lower end of the patch ram from traveling below the level of the bearing plate 150 which engages the upper surface of the board B. As a result of this arrangement, boards of different thicknesses may be clamped by the clamp 147 and the patch which is inserted will in every event be forced into the board so that its upper surface is substantially flush with the upper surface of the board. Obviously, the patches which are employed are of substantially the same thickness as the board being patched.

As is perhaps best illustrated in Figure 8 of the drawings, the tapered edges 159 and 160 of the slide guides 156 and 157 are milled away as indicated at 180 and 181 so that a patch C of trapezoidal cross section may be inserted in the path of movement of the patch ram 165 with its wider parallel surface against the bearing plate 155. From this position, the patch may be rammed downwardly by downward movement of the patch ram into the notch which has been cut into the edge of the board B.

From the foregoing description, it should be evident that the board B may be rolled over the rollers 119 until the edge of the board is properly located above the insert notch 130 in the table 15. The apparatus then performs a series of operations in sequence. The horizontal clamping block 113 is first moved laterally across the table 15 to urge the board B against the indexing shoulders 135 and 136. The vertical clamp 147 is then forced downwardly by operation of the piston in the cylinder 125 until the bearing plate 150 engages the upper surface of the board, thus clamping the board against the table. The carriage 33 which supports the cutter motor and the rotatable cutters then travels upwardly so that the cutter forms a notch in the edge of the board B which is trapezoidal in section. During this operation, the upper cutter 83 first forms one side of the notch and the lower cutter 84 then forms the other side thereof. When the cut is complete, the carriage 33 travels downwardly to its normal lowered position slightly below the level of the table.

The patch ram 165 is then forced downwardly by action of fluid in the cylinder 124 forcing the patch C into the notch in the board. This action does not take place until the patch has been inserted in position and the operator manually operates a pair of control switches, as will be later described. When the ram 165 reaches the lower extremity of its movement, the ram is reciprocated upwardly within the clamping unit 147, the clamping unit 147 is drawn upwardly by action of its cylinder 125 and the horizontal clamp 113 is retracted by action of fluid in its cylinder 111. The cycle is then complete and the board B may be replaced by another board to be patched.

Figure 11:
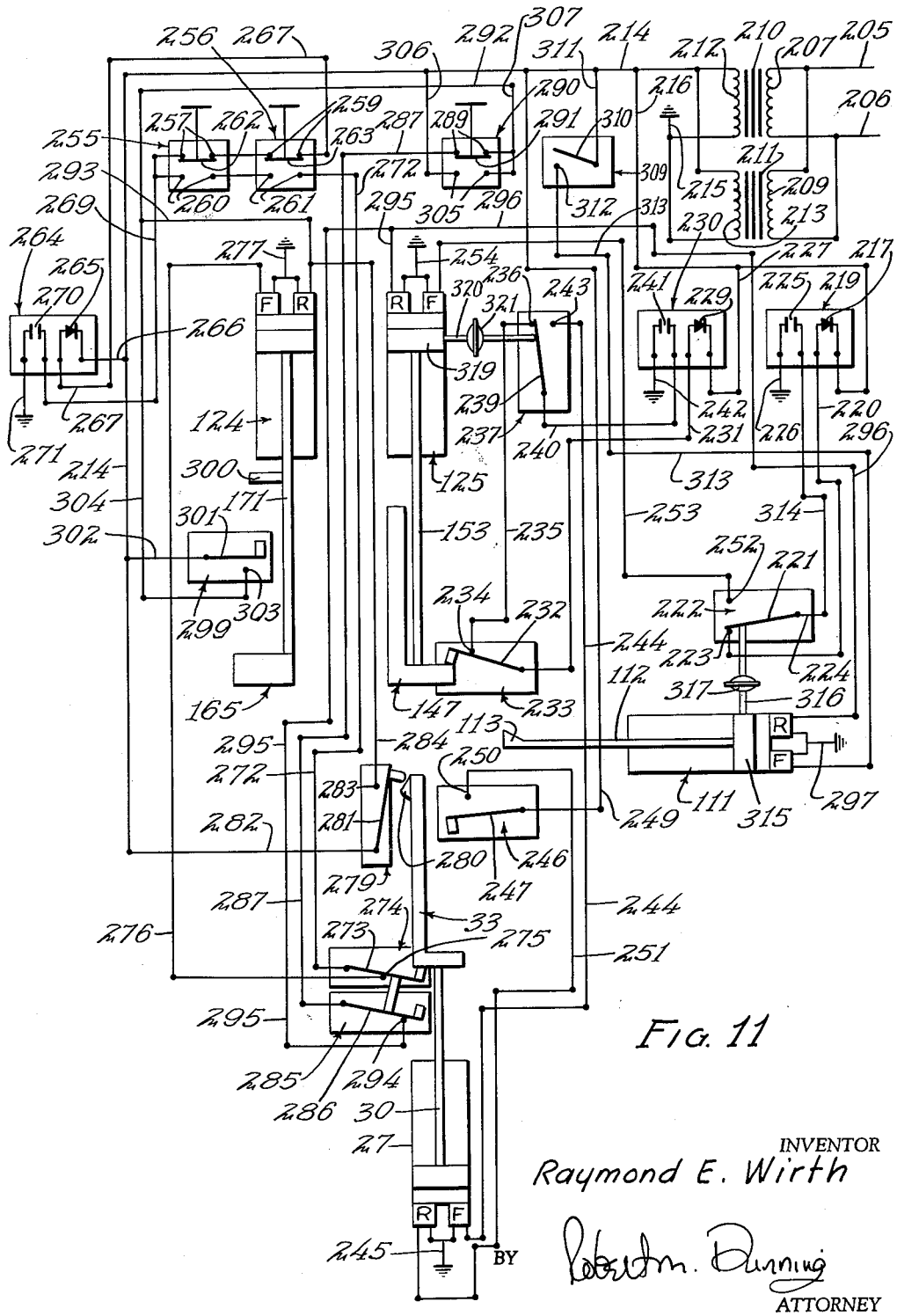
Figure 11 is a diagrammatic view of the electrical circuit used in controlling the operation of the apparatus.

In order to accomplish these various operations, a control is employed which is diagrammatically illustrated in Figure 11 of the drawings. In this figure, the cutter carriage 33 is diagrammatically illustrated together with its operating cylinder 27 and piston rod 30. The horizontal clamp 113 is also illustrated in conjunction with its operating cylinder 111 and piston rod 112. The vertical clamping unit 147 is diagrammatically illustrated together with its operating cylinder 125 and piston rod 153. Also illustrated, is the patch ram 165 together with its operating cylinder 124 and piston rod 171. In view of the complexity of the apparatus, these various elements are not shown in their proper proportions nor in their physical relation although the general direction of movement of these elements has been disclosed.

In the particular arrangement illustrated, the fluid cylinders are controlled by valves designated by identical letters R and F. These valves are solenoid actuated by a current impulse and the actuated valve remains open until the other valve is actuated. In other words, when the valve F of any cylinder is actuated, fluid under pressure is directed to the cylinder in a direction to force the piston and corresponding piston rod forwardly from the cylinder toward projected position. This fluid pressure in the cylinder continues until the solenoid valve R is actuated. When a current impulse energizes the valve R, the position of the valve is reversed and fluid under pressure is directed into the corresponding cylinder in a direction to retract the piston and piston rod into the cylinder. As each of the cylinders operate in the same manner, the same identifying terms have been used to simplify an understanding of the construction.

Also in the particular arrangement illustrated, the valves are for the most part actuated by a pulse of rectified current which has been stored in a capacitor during a period of inactivity and which is momentarily directed to a predetermined solenoid valve by the closing of a suitable switch. Obviously, the use of this specific type of apparatus is a matter of choice.

The cutter motor 45 operates continuously during the operation of the machine and accordingly the circuit to this motor is not disclosed in the wiring diagram. The cutter motor 45 is connected to the current supply line through a suitable switch which may of course include a starting relay. The line wires are indicated at 205 and 206, both of which are connected to the primary windings 207 and 209 of step-down transformers 210 and 211. The secondary coils 212 and 213 are connected in parallel, one terminal of each coil connecting with the current supply line 214 while the other terminal is shown as grounded at 215 to simplify the illustration.

The line wire 214 is connected by a conductor 216 to one terminal of a rectifier 217 mounted in an impulse storing unit 219. The other terminal of the rectifier 217 is connected by a conductor 220 to a switch blade 221 of a pressure actuated switch 222 which is normally in contact with a terminal 223 connected by a conductor 224 to a capacitor 225 in the impulse storage unit 219. As the other terminal of the capacitor 225 is grounded at 226, a current charge is stored in the capacitor which may be released upon operation of the pressure actuated switch 222.

The conductor 216 is also connected by a conductor 227 to a rectifier 229 in an impulse storage unit 230. The other rectifier terminal is connected by a conductor 231 to the contact blade 232 of a vertical clamp limit switch 233 which is held in engagement with a terminal 234 when the clamp 147 is elevated. The switch terminal 234 is normally closed when the clamp is in raised position and is connected by a conductor 235 to the terminal 236 of a pressure actuated switch 237. The switch 237 includes a switch blade 239 which is normally in contact with the terminal 236 unless the switch is subjected to pressure. The switch blade 239 is connected by the conductor 240 to a capacitor 241 forming a part of the impulse storing device 230. The other terminal of the capacitor 241 is grounded as indicated at 242.

The pressure actuated switch 237 also includes a terminal 243 which is connected by a conductor 244 to the piston advancing valve F of the cylinder 27, the other terminal of the solenoid valve being grounded at 245. A limit switch 246 is provided in the path of upward movement of the carriage 33 and is engaged as the carriage reaches its upper extremity of movement. The switch 246 includes a blade 247 connected by a conductor 249 to the line wire 214. The limit switch 246 includes a terminal 250 which is connected by a conductor 251 to the reversing or returning solenoid valve R of the cylinder 27, the other terminal of this solenoid valve being grounded at 245. Thus, when the carriage 33 reaches the upper extent of its movement, the solenoid valve R of the cylinder 27 is actuated to return the carriage 33 to its lowered position.

The pressure actuated switch 222 includes a terminal 252 which is engaged by the switch blade 221 when the valve 222 is subjected to pressure. This terminal 252 is connected by a conductor 253 to the solenoid valve F of the cylinder 125, the other terminal of the solenoid valve F being grounded as indicated at 254. A pair of manually operable switches 255 and 256 are mounted in series in a circuit which controls the operation of the patch ram 165 which is actuated by the cylinder 124. The purpose of the switches 255 anad 256 is to require that both of the hands of the operator be on these switches during reciprocation of the ram 165. The switch 255 includes a pair of normally closed terminals 257 which are in series with a pair of normally closed terminals 259 of the switch 256. The switch 255 also includes a pair of normally open terminals 260 which are in series with a similar pair of normally open terminals 261 of the switch 256. The two switches include manually operable blades 262 and 263 which may be manually moved from engagement with the normally closed terminals 257 and 259 to engagement with the normally open terminals 260 and 261 in order to actuate the ram cylinder 124.

A third impulse storing device 264 includes a rectifier 265 which is connected to the line wire 214 by a conductor 266. The other terminal of the rectifier 265 is connected by the conductor 267 through the normally closed terminals 257 and 259 of the switches 255 and 256 and the last of the normally closed terminals 257 is connected by a conductor 269 to one terminal of a capacitor 270, the other terminal of which is grounded at 271. Thus, during the time that the manually operable switches 255 and 256 are not in operation, a current impulse is stored in the capacitor 270. The conductor 269 is also connected to one of the normally open terminals 260 of the manual switch 255 and the last of these normally open terminals 261 of the switch 256 is connected by a conductor 272 to the switch blade 273 of a limit switch 274 which is actuated by downward movement of the cutter carriage 33 to close a contact to a switch terminal 275 in the limit switch 274. The terminal 275 is connected by a conductor 276 to the solenoid of the solenoid valve F of the ram cylinder 124, the other solenoid terminal being grounded at 277.

Thus, the ram 165 can only be actuated when the cutter carriage 30 is in lowered position and when the two manually operable switches 255 and 256 are actuated.

As the ram 165 is movable in the path of movement of the rotatable cutters during reciprocation of the table 33, a means is provided to insure the fact that the ram 165 is in elevated position during reciprocation of the carriage 33. This means comprises a safety switch 279 which is actuated by a lug or projection 280 on the carriage 33, the safety switch 279 being momentarily closed when the circuit through the safety switch 279 is closed. The blade 281 of the safety switch 279 is connected by a conductor 282 to the line wire 214 and the blade 281 is normally spaced from a terminal 283 connected by a conductor 284 to the solenoid of the solenoid valve R of the ram cylinder 124, the other terminal of which is grounded at 277. Thus, as the carriage 33 moves upwardly, opening the normally closed bottom limit switch 274, the lug 280 on the carriage 33 momentarily closes the circuit through the safety switch 279 thus energizing the solenoid valve R of the ram cylinder 124 to insure the fact that the ram 165 is in elevated position. Once the carriage 33 has opened the bottom limit switch 274, the ram advancing solenoid valve F of the cylinder 124 cannot be actuated until the carriage 33 returns to its lowered position.

A second limit switch 285 is also provided in the path of movement of the cutter carriage 33, the switch 285 being normally closed when the carriage 33 is in fully lowered position. In other words, the limit switch 285 operates simultaneously with the limit switch 274. The blade 286 of the limit switch 285 is connected by a conductor 287 to the normally closed contacts 289 of a manually operable switch 290. The terminals 289 are normally bridged by a manually operable switch blade 291. From the switch terminals 289, the conductor 292 leads to a conductor 293 extending through the solenoid valve R of the ram cylinder 124. The limit switch terminal 294 of the switch 285 is connected by a conductor 295 to the solenoid valve R of the vertical clamp cylinder 125 and through a continuation conductor 296 to the solenoid valve R of the horizontal clamp cylinder 111, the other terminal of which is grounded at 297. This circuit is controlled by a limit switch 299 operated by downward movement of the ram 165, the piston rod 171 of which includes a lug 300 which operates to close the limit switch 299 when the ram 165 reaches the lower end of its downward travel. The blade 301 of the limit switch 299 is connected by a conductor 302 to the line wire 214 and a normally open terminal 303 of the switch 299 is connected by a conductor 304 to the conductor 292 leading through the normally closed terminals 289 of the manual switch 290. The circuit for releasing the clamping cylinders extends from the grounds 297 and 277 through the solenoid valves R of the clamping cylinders 111 and 125, through conductors 296 and 295, through limit switch 285 and conductor 287, through the normally closed contacts 289 of switch 290, through conductors 292 and 304, through the switch 299 and conductor 302 to line wire 214. Thus, these clamping cylinders cannot be released unless the cutter carriage 33 is in its lowered position in which the lower limit switch 285 is closed.

The normally opened contacts 305 of the manually operable switch 290 may be electrically connected by manual operation of the switch blade 291. One of these normally open contacts 305 is connected by a conductor 306 to the line wire 214 and the other is connected by a conductor 307 to the conductor 292 and the conductor 293 to the solenoid valve R of the patch cylinder 124. The purpose of this manually operable switch 290 is to permit the ram 165 to be returned to its normal elevated position at the start of the operation of the machine or if the cycle of operation is interrupted when the ram cylinder is in partially lowered position.

The cycle of operation may be initiated by means of a switch 309 which is preferably a foot actuated switch. The blade 310 of the switch 309 is connected by a conductor 311 to the line wire 214 and the normally open terminal 312 is connected by a conductor 313 to the solenoid valve F of the horizontal clamp cylinder 111, the other terminal of which is grounded at 297. This completes the control circuit.

In operation, the foot switch 309 is operated, closing a circuit from the line wire 214 through the conductors 311 and 313 to the solenoid valve F of the cylinder 111. The valve F acts to introduce fluid under pressure into the cylinder 111 in a direction to urge the clamp 113 against the board to be clamped. This clamp 113 holds the board against the table indexing shoulders 135 and 136.

During the inoperative period of the apparatus, a current impulse is built up in each of the impulse storing devices 219, 230 and 264. The circuit to the capacitor 225 of the impulse storing device 219 extends from the line wire 214 through conductor 216 to the current rectifier 217, through conductor 220 to the pressure operated switch 222, the blade 221 of which normally connects the terminal 223 to a conductor 314 leading to the capacitor 225, the other terminal of which is grounded at 226. The charging circuit of the impulse storing device 230 extends from line wire 214 through conductor 216 and conductor 227 to the rectifier 219, the other terminal of which is connected through the conductor 231 to the switch blade 232 of the upper limit switch of the vertical clamping unit 147. In raised position of the clamping unit, the blade 232 is in contact with terminal 234 which is connected by a conductor 235 to the terminal 236 of the pressure switch 237. In raised position of the clamping unit 147 the pressure switch 237 has its switch blade 239 in connection with the terminal 236 and the switch blade is connected by a conductor 240 to the condenser 241, the other terminal of which is grounded at 242. Thus, this condenser or capacitor is also charged.

The charging circuit of the impulse storing device 264 extends from line wire 214 through conductor 266, rectifier 265, conductor 267, normally closed contacts 259 and 257 of the manually operated switches 256 and 255, and conductor 269 to the capacitor 270, the other terminal of which is ground at 271.

As movement of the piston in the horizontal clamping cylinder 111 is started by operation of the foot switch 310 as described, the piston 315 thereof (shown diagrammatically in Figure 11 uncovers the pressure conduit 316 leading to a bellows or diaphragm 317 which acts to move the switch blade 221 against the normally open terminal 252. This action causes the current impulse stored in the capacitor 225 to discharge through the conductor 314, switch blade 221, terminal 252, and conductor 253 to the solenoid valve F of the vertical clamping cylinder 125, the other terminal of which is grounded at 254. Fluid under pressure is then introduced to the upper end of the cylinder 125 forcing the piston 319 therein downwardly and urging the clamp 147 against the upper surface of the board B.

The piston 319 normally closes the pressure conduit 320 leading to the bellows 321 which actuates the pressure actuated switch 237. As the piston 319 moves downwardly, the conduit 320 is subjected to fluid pressure, acting through the bellows or diaphragm 321 to move the switch blade 239 into contact with the normally open terminal 243. This permits the impulse stored in the capacitor 241 of the impulse storing device 230 to discharge through the conductor 240, switch blade 239, terminal 243, and conductor 244 to the solenoid valve F of the cutter table reciprocating cylinder 27 permitting fluid under pressure to enter the lower end of the cylinder 27 to raise the cutter table 33. As the cutter table 33 starts its upward movement, the lower limit switches 274 and 285 are opened, thus opening the circuits to the valve F of the ram cylinder 124 and to the solenoid valves R of the two clamping cylinders 111 and 125. As a result, the ram cannot be projected while the cutter table is in motion and the clamping pressure cannot be released during the movement of the cutter table.

As the table 33 moves upwardly, the projection 280 momentarily closes the safety switch 279 thus momentarily closing a circuit from the line wire 214 through this safety switch 279 to the conductor 284 to actuate the solenoid valve R of the ram cylinder 124. This insures the holding of the ram 165 in an elevated position during reciprocation of the cutter table 33 even though this ram had been prematurely lowered by premature operation of the manually operated switches 255 and 256.

As the cutter table 33 reaches the upper extent of its travel, the upper limit switch 246 is actuated closing a circuit from line wire 214 through conductor 249, limit switch blade 247, terminal 250, and conductor 251 to the solenoid valve R of the cutter table operating cylinder 27. As a result, the flow of fluid under pressure through the cylinder 27 is reversed and the cutter table 33 moves downwardly to its lower extreme position. As the lower end of its travel is reached, the lower limit switches 274 and 285 are closed.

If at this stage of the operation the manually operable switches 255 and 256 are not operated, the two clamps will remain in clamping position and the patch ram will remain in elevated position. The manually operable switches 255 and 256 may be operated simultaneously with the momentary operation of the foot switch 310 if the complete cycle is to continue without operation. As the circuit to the valve F of the ram cylinder 124 is broken through the lower limit switch 274, the ram will not be operated until the cutter table has returned to its normal inoperative position. Alternatively, if these manual switches 255 and 256 are not operated during movement of the cutter table, the cycle of operation will be interrupted until both of these switches are simultaneously operated.

When the switch blades 262 and 263 are engaged with the normally open terminals 260 and 261 and when the lower limit switch 274 is closed, the current impulse from the impulse storing device 264 is permitted to discharge from the capacitor 270 through the conductor 269, the manual switch terminals 260 and 261, conductor 272, limit switch blade 273, terminal 275, and conductor 276 to the solenoid valve F of the ram cylinder 124, the other terminal of which is grounded at 277. The valve F then permits fluid under pressure to force the ram 165 downwardly to force the patch into the notch which has been cut in the board. When the ram 165 completes its downward movement, the lug 300 closes the lower limit switch 299 closing a circuit from line wire 214 through conductor 302, limit switch blade 301, terminal 303, and conductor 304 and 293 to the solenoid valve R of the ram cylinder 124. This valve R reverses the flow of fluid in the cylinder 124 to retract the ram 165 into elevated position. At the same time, a circuit is closed from line wire 215 through conductor 302, switch blade 301, terminal 303, conductor 304, conductor 292, normally closed terminals 289 of the manual switch 90, and through conductor 287 to the lower limit switch 285. This circuit continues through the limit switch blade 286, terminal 294, and conductor 295 to the solenoid valve R of the clamping cylinder 125. The actuation of this valve R reverses the flow of fluid into the cylinder 125 and acts to raise the vertical clamping unit 147 into its elevated position. The same circuit continues through the conductor 296 to the valve R of the horizontal clamping cylinder 111 acting to reverse the flow of fluid under pressure into the cylinder 111 and retracting the clamp 113 into its starting position. The cycle of operation is thus completed and the control circuit is returned to its starting condition. Thus it will be seen that a complete cycle of operation may be initiated by momentarily closing the foot switch 310 and operating the manual switches 255 and 256. If the ram 165 is lowered by actuation of the manual switches 255 and 256 prior to the operation of the foot switch 310, the safety switch 279 will function to return the ram to its elevated position prior to the elevation of the cutters a distance sufficient to contact the ram. As has been described, the ram does not move below the surface of the clamp engaging the top of the board and the safety switch 279 is actuated shortly after the table 33 starts its upward movement. In actual practice, the ram also operates at a higher speed than the cutter table so that the full retraction of the ram occurs materially before the cutters reach the upper limit of their movement.

In accordance with the patent statutes, I have described the principles of construction and operation of my improvement in edge patching apparatus, and while I have endeavored to set forth the best embodiments thereof, I desire to have it understood that changes may be made within the scope of the following claims without departing from the spirit of my invention.

I claim:

1. A board edge patching apparatus including a table, rotatable cutter means supported for vertical movement relative to said table, means for reciprocating said cutter means past said table, said cutter means being rotatable about a horizontal axis, a clamp mounted above said table and vertically reciprocable against a board overlying said table to hold said board against the table during reciprocation of said cutter means, said clamp forming a patch ram guide, a patch ram vertically reciprocable within said guide, said patch ram being in vertical alignment with said cutter means, means for reciprocating said clamp and guide, and means for reciprocating said patch ram relative to said guide.

2. The structure of claim 1 and in which said clamp and guide includes a patch receiving pocket in the path of movement of said patch ram.

3. The structure of claim 1 and including controlling means for sequentially moving said clamp and guide against a board on said table, moving said cutter means in both directions, and moving said ram in both directions.

4. A board edge patching apparatus including a table, rotatable cutter means mounted for vertical reciprocating movement relative to said table, said cutter means rotating about a horizontal axis, means for reciprocating said cutter means, a clamp mounted above said table and vertically reciprocable against a board overlying said table to hold said board against said table during reciprocation of said cutter means, said clamp forming a patch ram guide, a patch ram vertically reciprocable in said guide, said patch ram being in vertical alignment with said cutter means, means for moving said clamp and guide toward the board, means for moving said patch ram relative to said guide, and finally moving said ram and said clamp and guide in the opposite direction.

5. A board edge patching apparatus including a table having a notched edge therein, a board indexing shoulder engageable with an edge of a board overlying said notch, a clamp supported above said table for movement toward and away from the table, said clamp including a pair of opposed sides forming a vertical groove therein substantially aligned with said notch, a patch ram supported by and vertically slidable in said groove, and cutter means supported for vertical movement through said notch from a position beneath said table to a position above the table, and individual means individually operable for reciprocating said clamp, said cutter means, and said ram.

6. The structure of claim 5 including releasable clamping means engageable with a board on said table for urging the same against said indexing shoulder during reciprocation of said cutter means.

7. The structure defined in claim 5 and including a horizontally reciprocable clamp engageable with a board on said table for urging the board against said indexing shoulder during reciprocation of said cutter means, and means for reciprocating said last named clamp.

8. The structure of claim 5 and in which said cutter means includes a pair of laterally adjustable rotatable cutter heads operable to provide a cut of variable width.

9. The structure of claim 5 and in which said cutter means includes a pair of rotatable cutter heads, shafts supporting said cutter heads, and means supporting said shafts for pivotal movement about an axis midway between, and parallel to, the shaft axes, and means normally holding said shaft supporting means from rotation.

10. The structure of claim 5 and in which said clamp includes a patch receiving pocket in the path of movement of said patch ram.

11. The structure of claim 5 and including a control means operated by the reciprocation of said clamp into board clamping position to actuate said cutter means reciprocating means, means actuated by the return reciprocation of said cutter means for actuating said patch ram reciprocating means in one direction, and means actuated by the movement of said patch ram in said one direction for actuating said patch ram reciprocating means and said clamp reciprocating means for returning said patch ram and clamp to starting position.

12. A board edge patching apparatus including a bed having a notched edge, indexing shoulder means on said bed on opposite sides of said notched edge engageable with a board engaging said bed, a clamp movable toward and away from said bed and operable to clamp a board against said bed, a clamp moving means, a cutting means movable through said notch, means movably supporting said cutter means for reciprocating movement through the plane of the board and through said notch, means for reciprocating said cutter means, a patch ram in vertical alignment with said cutting means, means movably supporting said patch ram for movement toward and away from said cutter means and the notched portion of said bed, and means for moving said patch ram toward and away from the notched portion of said bed.

13. The structure of claim 12 and including a second clamping means, said second clamping means holding the patch engaged during operation of said cutter means, means movably supporting said second clamping means for movement toward and away from said indexing shoulder means, and means for moving said second clamping means toward and away from said indexing shoulder means.

14. The structure of claim 12 and in which said cutting means includes a pair of rotatable cutter heads.

15. The structure of claim 12 and including a control including means operated by movement of said clamp into board clamping position to actuate said cutter means reciprocating means, means actuated by the return reciprocation of said cutter means for actuating said patch ram moving means in one direction, and means actuated by the operation of said patch ram in said one direction for actuating said clamp moving means and said patch ram moving means for moving said clamp and said patch ram to starting position.

16. A board edge patching apparatus including a table, rotatable cutter means supported for vertical reciprocating movement relative to said table, means for reciprocating said cutter means past said table, said cutter means rotating about a horizontal axis, a clamp and guide vertically reciprocable against a board overlying said table operable to hold the board against the table during reciprocation of said cutter means, a patch ram vertically reciprocable in said guide, said patch ram being in vertical alignment with said cutter means, means for moving said clamp and guide against the board, and means for moving said patch ram relative to said guide toward the board, and finally moving said ram and said clamp and guide in the opposite direction, the structure including a shoulder at one edge of said table against which the board may engage, and clamping means engageable with the board to urge the same against said shoulder during reciprocation of said cutter means.

References Cited in the file of this patent

UNITED STATES PATENTS

| | | |
|---|---|---|
| 443,434 | Freeman | Dec. 23, 1890 |
| 1,163,098 | McDowell | Dec. 7, 1915 |
| 1,549,691 | Steger | Aug. 11, 1925 |
| 1,968,091 | Nash | July 31, 1934 |
| 1,973,757 | Goss et al. | Sept. 18, 1934 |
| 2,336,704 | Skoog | Dec. 14, 1943 |
| 2,663,332 | Peterson | Dec. 22, 1953 |
| 2,764,192 | Poss | Sept. 25, 1956 |

FOREIGN PATENTS

| | | |
|---|---|---|
| 1,083,914 | France | June 30, 1954 |